Feb. 3, 1948.  T. E. THOMAS  2,435,466
CURING BAG
Filed July 30, 1945    2 Sheets-Sheet 1
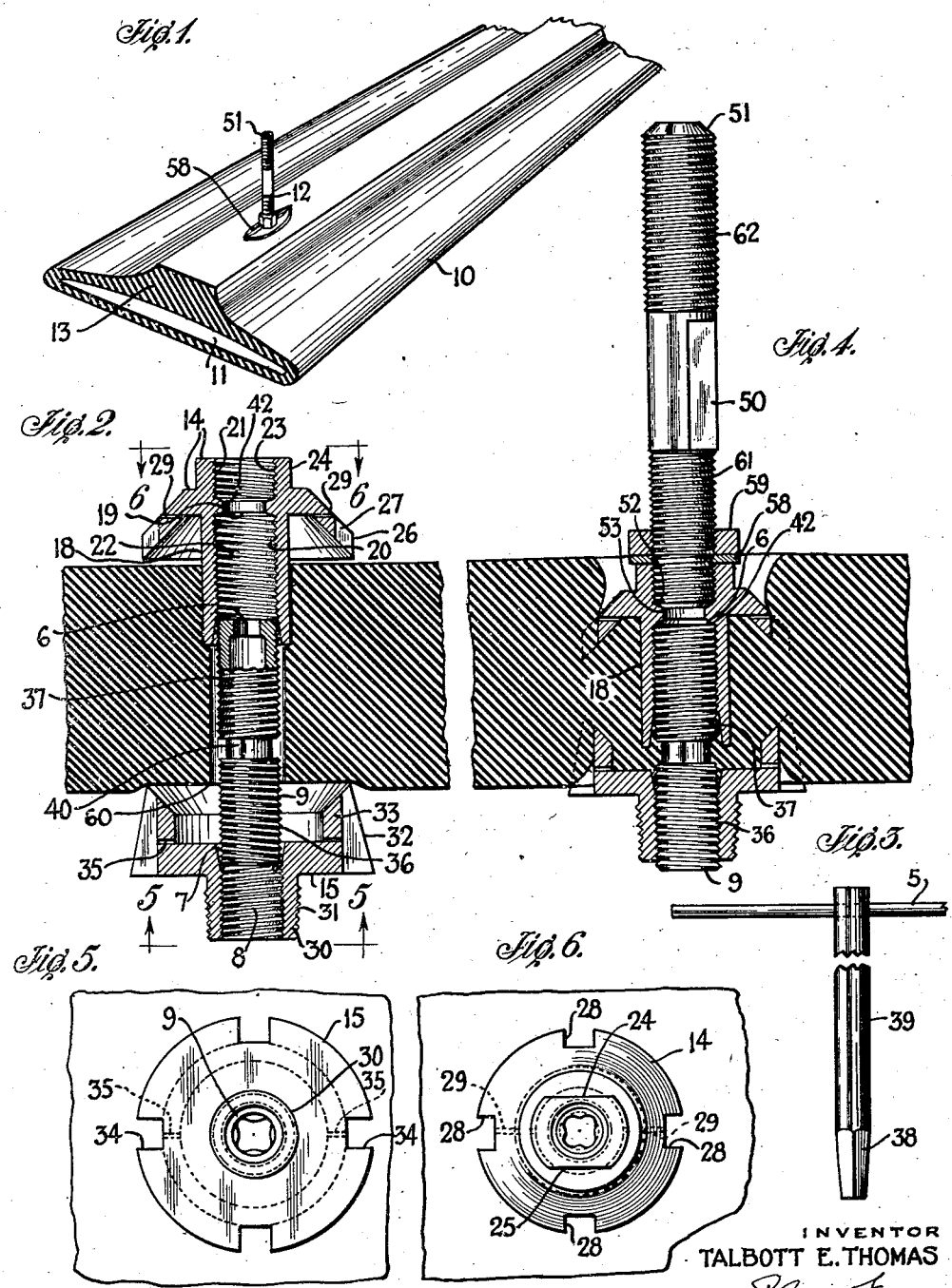
INVENTOR
TALBOTT E. THOMAS
BY
ATTORNEYS

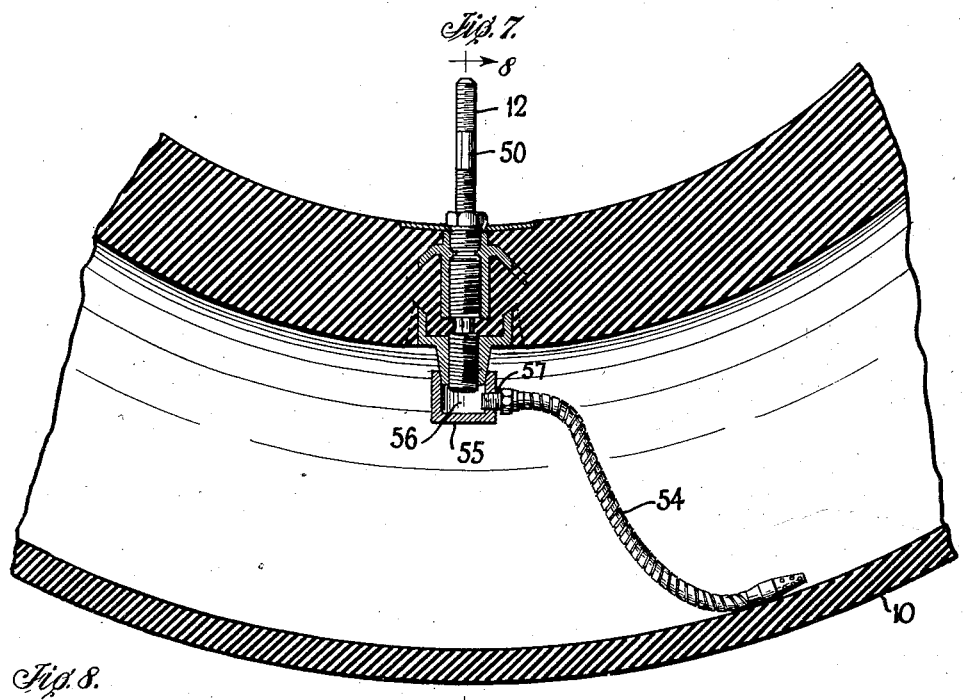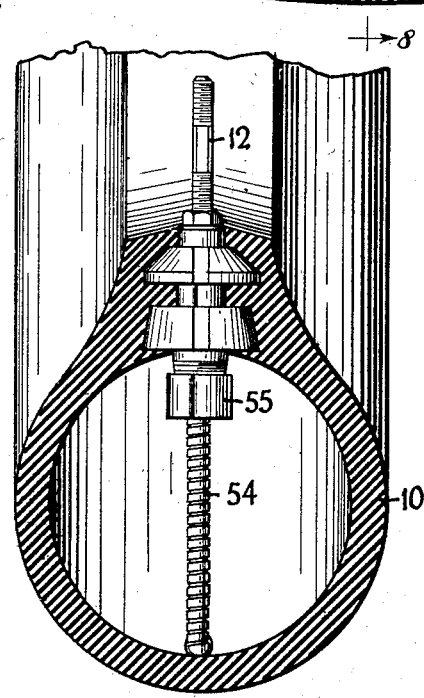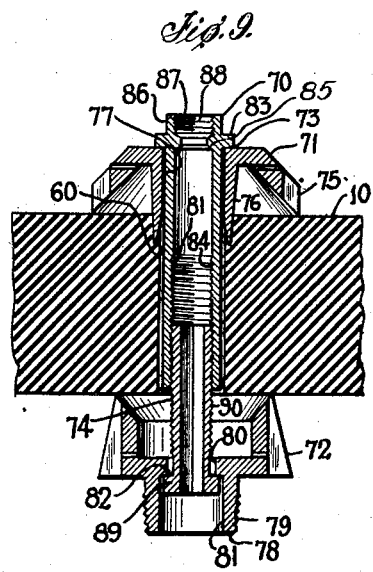

Patented Feb. 3, 1948

2,435,466

UNITED STATES PATENT OFFICE 2,435,466

CURING BAG

Talbott E. Thomas, Cuyahoga Falls, Ohio, assignor to The Firestone Tire & Rubber Company, Akron, Ohio, a corporation of Ohio Application July 30, 1945, Serial No. 607,714

6 Claims. (Cl. 18—45)

This invention relates to valved inflatable curing bags and refers particularly to air, inert gasses, water and steam bags for use in curing or vulcanizing pneumatic tires and to method of producing same.

In vulcanizing pneumatic tires, inflatable formers, commonly referred to as curing bags, are generally used in providing the required internal pressure to force the tire against the tire mold. Such curing bags are expansible endless tubes composed of rubber, or rubber like material, and are provided with metal inflation valve stems to facilitate the introduction of air, water or other suitable fluid under pressure. The valve stems are secured to the inner or base walls of the curing bags, extending through said walls and have means for attachment thereto, but considerable difficulty has been experienced in effecting a fluid-tight anchorage of the stem in or on the rubber which will continue to be fluid tight through successive tire curing operations. In service, after a curing bag has been used in a tire curing operation, the bag is removed from the cured tire and used in the curing of another tire and in like manner for as many additional tire cures as the condition of the curing bag will permit. Since curing bags are expensive and since a leaking bag may cause a defective tire, it is desirable to get the maximum number of cures from each bag and to overcome the causes of bag failures. One of the most common causes of failures of curing bags is leakage of the inflation fluid along and past the valve stem. This type of bag failure is known as a valve leak. Two methods of combating curing bag valve leaks have been resorted to in the art. One method depends upon obtaining a bond between the rubber and the metal curing bag stem, and the other method to mechanically drawing the base of a valve stem against the inside wall of the base portion of the bag thus obtaining a fluid tight seal. Inserting or removing a curing bag from a tire results in extreme distortion of the rubber in the bag walls; however, the metal valve stems are not distorted which results in the rubber prematurely breaking its adhesion or bond to the metal, or in the case of a mechanical valve stem in the rubber pulling from between clamping members. When a valve leak occurs it may develop during the tire curing operation in which event it is often necessary to classify the tire as defective. A valve leak in a curing bag in which rubber adhesion to the valve stem is employed to prevent leaks usually results in scrapping the bag or at least in building into the bag a new valve stem to replace the old. Building in new stems is expensive and not entirely satisfactory since bags with replacement or built-in stems often fail before many additional cures have been obtained. Even so, curing bag constructions in which an adhesion between the rubber and metal valve stems was depended on to prevent leaks were heretofore generally more successful than mechanical valve stems. Said mechanical valve stems usually comprised a valve stem base integral with the valve stem and being adapted to contact the inside surface of the bag base and an externally applied washer backed up by a nut whereby the opposite surfaces of the base walls of the curing bag were clamped or were compressed toward each other. Curing bags are usually at least one-half inch thick at their base portions and in large sizes often two inches or more thick. The rubber compound or similar material of which curing bags are composed cannot long resist the pressure necessary to draw the valve base against the inside portion of the bag wall base and consequently gradually flows from between the pressure members, namely, the valve stem base and external washer. Such movement of stock away from the pressure members often resulted in valve leaks.

An object of the present invention is to provide a valve stem for curing bags and tire inner tubes, said stem having clamping members mechanically movable toward each other on the valve stem, the clamps being so shaped as to prevent rubber or the material composing the base wall of the bags or tubes from escaping from between the clamping members.

Another object of the invention is to provide a hollow inflatable article having a valve stem which will be effective in preventing valve leaks when used in such articles made of butyl rubber, or other rubber like materials having poor adhesive qualities compared to natural rubber compounds.

A further object of the invention is to provide a curing bag valve which provides means for trapping the material of which the bag is composed, between clamping members and the valve stem proper, and forcing the trapped material firmly about the valve stem when said clamping members are moved toward each other.

A still further object of the invention is to provide convenient means for operating valve stem clamping members externally of a bag throughout a bag's life.

Another object of the invention is to provide a valve stem for curing bags which stem may be removed from worn out curing bags and used in new bags without expensive salvaging operations.

Yet another object of the invention is to provide a curing bag valve stem so constructed that valve stem leaks may be stopped as they develop without repairing the bag.

The foregoing and other objects, features and advantages of the invention will be readily apparent from the following description in connection with the accompanying drawings, wherein a preferred form of the invention has been shown by way of illustration, and wherein:

Fig. 1 is a perspective view of an end portion of a curing bag, showing a valve embodying the present invention in position in the bag before the bag is vulcanized in a curing bag mold;

Fig. 2 is a fragmentary sectional view showing relative positions of the valve parts and the curing bag as they appear preparatory to tightening clamping members against the base wall of the curing bag, one of the valve parts being a hollow bolt show partially broken away showing a valve socket in the end thereof;

Fig. 3 shows in elevation a suitable wrench for tightening the clamping members of a valve stem embodying the present invention;

Fig. 4 is a sectional view showing the valve tightened in position preparatory to laying the bag in its vulcanizing mold with a valve extension and washer in place as in Fig. 1;

Fig. 5 is a plan view taken on line 5—5 of Fig. 2;

Fig. 6 is a view taken on line 6—6 of Fig. 2;

Fig. 7 is a longitudinal section view through the valve portion of a finished bag showing a flexible hose connected to the inner end of the valve;

Fig. 8 is a transverse sectional view on the line 8—8 of Fig. 7; and

Fig. 9 is a fragmentary sectional view of a modified form of the invention.

The invention has been illustrated in the drawings as applied to a curing bag, which may be formed of butyl or natural rubber compound or of any other suitable material, and which is in the form of a pliable annular tube 10 the interior of which constitutes a fluid chamber 11 into which air, inert gas, steam, water or the like may be introduced through a valve stem indicated generally at 12. The bag 10 is of such a cross sectional configuration when inflated as to conform to the size and shape of the interior of a finished tire. In service the bag is mounted in an unvulcanized tire to provide the internal tire pressure necessary for proper molding and vulcanizing of the tire. It has been found advisable and it is common practice in most sizes of bags to form the inner wall or base 13 of the bag thicker than the other wall portions for reasons well known to those familiar with the art.

By reference to the drawings, it will be seen that the valve stem 12 comprises an outer cup-shaped anchor member 14 which is formed of brass, an inner cup-shaped anchor member 15 also formed of brass, and a corrosive resistant metal hollow bolt or externally threaded tube 9 composed of stainless steel or the like and a valve extension 50.

The cup member 14 has extending from its cupped portion 26 a centrally positioned cylindrical boss 18 and an axially outwardly projecting portion 24 extending from the central portion of the base of the member 14, said portion 24 being cylindrical with flat side portions 25. The boss 18 and projection 24 have axial bores 20 and 21 respectively. The bores 20 and 21 terminate at their inner ends in an annular shoulder 19. The sides of the bores 20 and 21 are threaded with right hand threads 22 and 23 respectively. It is to be noted, however, that the side of the bore 20 for a distance from its outer end is smooth and is radially outwardly tapered. Side 27 of the cup 26 has anchoring notches or grooves 28 formed in its edge and air vents 29 provide means of escape for air which may become trapped in the cup.

The cup member 15 has a centrally disposed axially outwardly extending portion 30 having external pipe threads 31. Member 15 has a left hand threaded bore 8 extending axially through the center of said members 15 and 30. The side 33 of the cup portion 32 of member 15 has notches or grooves 34 cut therein, and has air vents 35 traversing the side 33 from the bottom portion of the cup to the bottom of the notch 34. The bore 8 terminates at the bottom of the cup portion 32 in an unthreaded flared wall 7. Only four notches 28 and 34 and two vents 29 and 35 have been illustrated but it is to be understood that the invention is not to be limited to a particular number of notches or vents.

The anchor members 14 and 15 are in spaced relation and are carried in threaded relation with the hollow bolt 9, said bolt having oppositely externally threaded ends 36 and 37. The end 36 has a left and end 37 has a right hand thread. The bore through the bolt 9 is round except at the outer end of the bolt's end portion 37 the bore is broached and is adapted to receive in operative relation a complementary shaped end portion 38 of a wrench 39 the wrench having cross handle 5. The threads on the bolt extend from the outer ends of the bolt to the middle area leaving an unthreaded portion 40 of ⅛″ or more in width, said portion 40 being cut into the bolt approximately as deep as the threads. The end 37 of the bolt terminates in a cone shape portion 6 which portion seats against a seat 42 on the shoulder 19 when the cups or clamping members 14 and 15 have been drawn to their extreme closed position.

A valve stem extension 50 having threaded portions 61 and 62 and terminating at its ends in cone shape portions 51 and 52 are provided. The portion 52 of said extension is adapted to seat on a seat 53 on the annular shoulder 19. The portion 51 is adapted to seat in a proper fitting, not shown, connected with a source of fluid pressure such as air, steam, water, inert gas or other pressure medium which may be found to be satisfactory.

Preferably a rigid washer 58 backed up by a hexagonal nut 59 is used in the manner common in the art.

If water or steam are used as a pressure medium a drainage hose 54 is attached to member 15 by means of a cap 55 retained in threaded relation on the threads 31 of the portion 30. The opening in the hose 54 communicates with the inside 56 of the cap 55 through a threaded opening 57 into which it is threaded.

In the manufacture of a finished curing bag the components 14, 15, 9, 50, 54, 55, 58 and 59 of the 12 are manufactured separately by methods well known to those familiar with the art. While the hollow bolt 9 has been shown as having a round central hole except at its broached end, it is to be understood that the invention is not to be limited to such a bolt since hollow bolts with square holes running its entire length would be a convenient way of manufacturing a hollow bolt and a wrench with a square end adapted to fit into such square hole would turn the bolt. Other methods of turning the bolt, such, for example, as by the use of a keyed wrench, will occur to those having mechanical skill, therefore it is to be understood that such modifications are within the spirit of the invention. The bag 10 is composed of butyl rubber and is formed by an extruding or tube machine operation common in the manufacture of curing bags. After the unvulcanized extruded bag has been cut to length, or approximate length, a valve hole 60 is punched through the bag at its base wall 13. The members 9, 15, 54 and 55 are assembled by starting the bolt in its threaded relation with the member 15 as shown in Fig. 2, and then threading cap 55 into position relative to portion 30 of the member 15, and attaching the hose 54 in threaded relation with the cap 54. This assembly is then placed inside the unvulcanized bag with the end 37 of the bolt projected through the valve hole 60 and with the edge of the cup 32 contacting the inside surface of the bag 10. Next the embossed portion 20 of member 14 is pressed into valve hole 60 until the threaded portion 37 of bolt 9 contacts the threads 22 of the boss 18. The length of the bolt is such relative to the thickness of the base 13 that said contact is made just before the edge of the side 27 of the cup 26 contacts the outside surface of said base 13. By using a suitable wrench on the flats 25 of the projecting portion 24 the member 14 is run down on the threads of the bolt until the edge of the side 27 contacts the surface of the bag. It is to be noted that in this position that the edges of the cups of members 14 and 15 are in threaded relation with the bolt and in opposed relation in contact with opposite sides of the base of the bag. Next the end 38 of the wrench 39 is inserted in the end 37 of the bolt and the bolt is turned counter-clockwise. As will be seen by reference to the left and right hand threaded arrangement of the bolt and member 14 and 15 the counter-clockwise turning of the bolt draws the clamping members 14 and 15 toward each other with the mechanical advantage of both the wrench and the threads. The clamping members are drawn toward each other until the sides 27 and 33 of the members 14 and 15 respectively cut into the base 13 far enough to permit the bottoms of the cups of said members 14 and 15 to contact the base 13, or, in other words, until said cups are filled with butyl rubber or other material of which the bag may be composed. The drawing of the members 14 and 15 against the unvulcanized rubber causes a pronounced depression in the base of the bag about member 14 with the portion 24 projecting outwardly through the depression. Next the valve extension 50 is threaded into position in portion 24 with its cone shape portion 51 of the extension 50 seated in fluid tight relation on its seat 52. A washer or plate 58 is placed on the extension 50 and is backed up with a lock nut 59 run down on threaded portion 61 of said extension thus anchoring the washer against the end of the boss 24 and locking the extension against its seat 52. The bag is next spliced in the usual manner and laid in a curing or vulcanizing mold with the bag connected to a continuous supply of air, or steam pressure or the like, through the extension 50. As the internal pressure builds up in the bag the rubber is pressed against the sides of the bag mold and as the bag material becomes heated the rubber, or other suitable material of which the bag may be composed, molds or flows about the washer 58 leaving the cup portion 26 of member 14 completely embedded in the base of the bag as will be seen by reference to Figs. 4, 7 and 8. In drawing the cup members 14 and 15 into clamped relation with the bag base escape of air from the cup is prevented by contact of the rubber with the edges of the cup members. It is desirable that trapped air in the cups be avoided and means for permitting the escape of air from the bottom of the cup members 14 and 15 are provided by vents 29 and 35 respectively. After the rubber entering the cups forces the air from the cups through the vents the rubber follows the air and fills the vents with rubber. It has been found that if the diameter of the vents does not exceed $\frac{3}{32}''$ of an inch that the rubber molded therein prevents air or other internal curing pressure medium from passing through the vents even though the outer ends of the vents become exposed to the internal pressure medium.

The bag 10 has been illustrated as being equipped with one valve only; however, if two valves are to be used, as is sometimes the case when circulating hot water is used as an internal pressure and heating medium, then an additional valve 12 may be installed in the same manner described above. If air is to be used as the internal pressure medium the drainage hose 54 may be omitted and a modified cap be substituted for cap 55. Such modified cap may be similar to cap 55 but having a plurality of holes such as hole 57 except the holes need not be threaded and the hose 54 may be omitted.

After the curing bag has been removed from its curing mold the extension 50 is removed and clamping members 14 and 15 drawn toward each other by means of the wrench 39 inserted in the hollow bolt 12. It has been found that about one turn of said bolt is sufficient for this initial tightening of the clamping members after the bag has been molded. During the cure of the bag the rubber is forced against the said bolt, clamping members and washer so that uninterrupted contact is made therewith; however, it has been found that the tightening of the clamping members as just described presses the rubber more firmly into the cup portions and about the metal between the cup portions. It is particularly pointed out that as the cup portions move toward each other that the rubber is severely crowded between the bolt and the inclined plane surface of the radially outwardly flared unthreaded portions of the clamp members 14 and 15. The small volume of rubber compressed within said flared portion forms high compression ribbon-like collars of rubber which are very effective in preventing air, steam or water or other inflation pressure medium from leaking between said highly compressed rubber and the metal. Whether the explanation of how the rubber in said flared portions prevents leaks is accurate, it has been found that when the flared feature is embodied in the valve construction, elimination of leakage has resulted. In service the rubber about the valve stem of a curing bag is alternately pulled and crowded as is well known by those familiar with the operation of vulcanizing tires. This movement of rubber resulting from the said crowding and pulling tends to break the rubber loose from an air tight or water tight contact with the valve. However, the rubber which has been molded into the cup portions of members 14 and 15 is substantially protected from the pull and crowd of the rubber during the bag removal from the tire and during the tire molding operation, and in fact the rubber in the cups is protected from any distortion of the bag. It is pointed out that with the prevention of leaks along the bolt 9 that a leak along or around the metal of the clamping portions 14 and 15 must travel about 75% farther than it would have to travel if the prior art straight valve stems were used. The greater the distance required for a leak to develop on a long valve stem, the more tires can be cured before a valve leak occurs; however, in the present valve construction not only is the distance from the inside of the bag along the surface of the valve stem to the atmosphere increased over that of any previous valve stem construction of which applicant has any knowledge, but the greater distance includes areas in the cups where the rubber is protected against distortion and areas along the metal where the rubber has been subjected to mechanical pressure over the normal pressure received during the vulcanizing and molding of the curing bag. Heretofore the rubber adjacent the valve stems of curing bags have been subjected to mechanical pressure, the rubber being squeezed between a valve stem base in contact with the inside surface of the bag and a washer against the outer surface of the bag; however, as is well known, rubber under pressure gradually flows away from pressure, and this is particularly true when the rubber is subjected to high temperatures as it is in vulcanizing tires. Applicant's cups trap the rubber therein and effectively combat the movement of the rubber away from the mechanical pressure area created by the clamping members. In order to further resist the flow of rubber away from the valve stem and to force the rubber firmly against the metal and bolt within the cups the cup portion 26 has a smaller diameter than the diameter of cup portion 32; thus as these cups approach each other the inner cup tends to overlap the outer cup and it has been found that this arrangement is more effective in preventing valve leaks than opposed cups of the same diameter.

The notches 28 and 34 in clamping members 14 and 15 respectively serve to anchor the cup portions 26 and 34 against turning when the bolt 9 is turned by means of the wrench 39 for the purpose of drawing the clamping members toward each other.

Although the present valve construction has resulted in an increase in the number of tire cures on a curing bag before a valve leak develops such leaks may develop if the bag does not fail from other causes. When a valve leak does develop in a bag using the present valve stem the leak can be stopped by the simple expedient of removing the extension 50 thereby exposing the broached portion of the hollow bolt 9, inserting the end 38 of the wrench 39, manually turning the wrench causing the clamping members 14 and 15 to travel axially toward each other on the threads of the bolt 9. After the clamping members have been drawn toward each other a distance sufficient to again seat the rubber about the metal of the valve stem in air tight relation the extension 50 is again threaded into operative position and the curing bag is ready for service again. This operation may be repeated until the clamping members come into contact; however, it has been found that curing bags usually fail from some other cause before the present valve stem reaches its limit of clamping movement. After a curing bag in which the present valve stem has been used fails the valve stem is simply removed from the old bag and transferred to a new bag by disassembling and reassembling its parts.

The modified form of the invention illustrated in Fig. 9 shows a valve stem 70 with its components and a fragment of a curing bag in the relative positions to each other they occupy preparatory to tightening clamping members of the valve stem against the base wall of the bag. Valve stem 70 comprises outer and inner cup-shaped anchor or clamping members 71 and 72 respectively, and two hollow bolts or tubes 73 and 74. Clamping member 71 has extending from the bottom of its cupped portion a cylindrical boss 76. A smooth central axial bore 77 passes through member 71 and boss 76.

Anchor or clamping member 72 has a centrally disposed axially outwardly extending portion 78 having external pipe threads 79. Member 72 has a central axial smooth bore 80 extending therethrough which communicates with a similar, but somewhat larger bore 81 formed through the portion 78 of member 72. A shoulder 82 is formed at the junction of bores 80 and 81.

Hollow bolt 73 has an annular radially outwardly extending shoulder 83 adapted to bear and turn against the outer flat surface about the bore 77 of member 71. The inner end of bolt 73 has internal threads 84 and a seat 85 opposite the shoulder 83, said bolt 73 having an axially outwardly projecting portion 86 which portion has an axial bore 87. The side of bore 87 has threads 88 to receive in threaded relation a curing bag extension not shown, in similar manner as extension 50 is received in projection 24 as was explained hereinabove in reference to Fig. 4.

Hollow bolt 74 has a head 89, and external threads 90, said threads 90 being adapted to engage threads 84 of bolt 73. The bore of the bolt 74 is broached providing a socket for a wrench by which bolt 74 is turned whereby the cup-shaped anchor or clamping members 71 and 72 are drawn toward each other.

In assembling valve 70 in operative position in the pliable annular tube or bag 10 a valve stem hole 60 is punched through the base of the bag. Next the hollow bolt 74 is projected into member 72 with the head 89 against shoulder 82. Before the curing bag is spliced this assembly of members 72 and 74 is inserted in the open end of the bag and the bolt 74 is projected into the hole 60 until the cup member 72 contacts the inside of the bag 10 and the bolt head 89 contacts the shoulder 82. Next the cup member 71 and the bolt 73 are similarly assembled with the shoulder 83 in contact with the surface of cup member 71. The bolt 73 is projected into hole 60 until its thread end contacts the threaded portion of bolt 74. Next a wrench similar to wrench 39 but of suitable size is inserted through the bore of bolt 73 into the broached portion of bolt 74 which forms a wrench socket. Next the bolt 74 is turned on its axis and as the said bolts are in threaded engagement by turning bolt 74 the bolts may be tightened up and the shoulder 83, and the head 89, are drawn against clamping members 71 and 72 respectively, whereby said clamping members are drawn toward each other in the general manner as the cup members 14 and 15 of Fig. 2. Notches and vents shown in anchor or clamping members 71 and 72, but not identified, correspond to the vents and notches of the cup members of Fig. 2 and serve the same purpose. A cap such as 55 of Fig. 7 may be attached in threaded relation to portion 78 and drainage hose, such as 54 of Fig. 7, may be attached to the cap. Obviously valve stem 70 functions in a manner very similar to valve stem 12 and for that reason a further discussion is deemed to be unnecessary.

While, throughout the specification, I have referred to a valve and a valve stem, it will be understood that these are shop terms used to designate a hollow filling stem, and actually there is no valve included in the stem.

It will now be apparent that an improved curing bag and novel method for producing same have been provided constituting a substantial advance in the art. While the invention has been disclosed as specifically embodied in a curing bag, it is not to be restricted to such use since the salient features may be incorporated in other types of inflatable articles.

Furthermore it is to be understood that the invention is susceptible of modifications in the details of construction and arrangement of parts, and the right is herein reserved to invoke such changes as fall within the scope of the appended claims without departing from the spirit of the invention.

What is claimed is:

1. An inflatable article, comprising a hollow body of pliable material, a valve stem extending through the wall of said body, said valve stem consisting of a hollow bolt threaded with opposite threads at each end, a pair of cup-shaped anchor members mounted on said bolt, said cup-shaped members having axial threaded bores therethrough and being mounted on said bolt in threaded relation therewith with the concaved sides of the cup-shaped members in opposed relation.

2. An inflatable article, comprising a hollow body of pliable material, a valve stem extending through the wall of said body, said valve stem consisting of a hollow bolt threaded with opposite threads at each end, a pair of cup-shaped anchor members mounted on said bolt, said cup-shaped members having axial threaded bores therethrough and being mounted on said bolt in threaded relation therewith with the concaved sides of the cup-shaped members in opposed relation, said bolt being accessible externally of said body and being turnable on its longitudinal axis in the wall of said body by means of a wrench inserted in its externally accessible end.

3. An inflatable article, comprising a hollow body of pliable material, a valve stem extending through the wall of said body, said valve stem consisting of a hollow bolt threaded with opposite threads at each end, a pair of cup-shaped anchor members mounted on said bolt, said cup-shaped members having axial threaded bores therethrough and being mounted on said bolt in threaded relation therewith with the concaved sides of the cup-shaped members in opposed relation, the cup portion proper of the outer of said cup-shaped members being entirely embedded within the base portion of said inflatable article.

4. An inflatable article, comprising a hollow body of pliable material, a valve stem extending through the wall of said body, said valve stem consisting of a hollow bolt threaded with opposite threads at each end, a pair of cup-shaped anchor members mounted on said bolt, said cup-shaped members having axial threaded bores therethrough and being mounted on said bolt in threaded relation therewith with the concaved sides of the cup-shaped members in opposed relation, said axial bores terminating adjacent the inside bottom of the cup portions in radially outwardly tapered smooth portions forming in cross section wedge-shaped spaces between said bolt and said tapered portions.

5. A valve stem for an inflatable article provided with a hollow screw threaded bolt having a pair of cup-shaped anchor members in adjustable threaded relation with said bolt, means for turning said bolt on its axis, one end of said bolt having a right hand and the other end a left hand thread, whereby each of said anchor members are simultaneously movable toward the other by the turning of said bolt on its axis.

6. An inflatable article, comprising a hollow body of pliable material, a valve stem extending through the wall of said body, said valve stem consisting of a hollow bolt threaded with opposite threads at each end, a pair of cup-shaped anchor members mounted on said bolt, said cup-shaped members having central axial threaded bores therethrough and being mounted on said bolt in threaded relation therewith with the concaved sides of the cup-shaped members in opposed relation, the cup portion of one of said cup-shaped members being entirely embedded within the base wall of said inflatable article.

TALBOTT E. THOMAS.

REFERENCES CITED

The following references are of record in the file of this patent:

UNITED STATES PATENTS

| Number | Name | Date |
|---|---|---|
| 1,570,157 | Knepper | Jan. 19, 1926 |
| 1,927,803 | Mullin | Sept. 19, 1933 |
| 2,318,376 | Crowley | May 4, 1943 |
| 1,818,536 | Crossan et al. | Aug. 11, 1931 |
| 1,129,585 | Newsom | Feb. 23, 1915 |
| 1,419,471 | Reynolds | June 13, 1922 |
| 1,485,526 | Pulverman | Mar. 4, 1924 |

FOREIGN PATENTS

| Number | Country | Date |
|---|---|---|
| 675,538 | France | Nov. 7, 1929 |
| 502,355 | Germany | Nov. 11, 1928 |